United States Patent
Bui et al.

(10) Patent No.: US 8,213,552 B2
(45) Date of Patent: Jul. 3, 2012

(54) DEMODULATION METHOD

(75) Inventors: Thanh Bui, Victoria (AU); Jiun Siew, Victoria (AU)

(73) Assignee: NEC Corporation, Tokyo (JP)

( * ) Notice: Subject to any disclaimer, the term of this patent is extended or adjusted under 35 U.S.C. 154(b) by 527 days.

(21) Appl. No.: 12/311,030

(22) PCT Filed: Sep. 19, 2007

(86) PCT No.: PCT/JP2007/068742
§ 371 (c)(1),
(2), (4) Date: Mar. 17, 2009

(87) PCT Pub. No.: WO2008/035809
PCT Pub. Date: Mar. 27, 2008

(65) Prior Publication Data
US 2009/0323866 A1 Dec. 31, 2009

(30) Foreign Application Priority Data

Sep. 20, 2006 (AU) ................................. 2006905197
Aug. 31, 2007 (AU) ................................. 2007214342

(51) Int. Cl.
*H04L 27/06* (2006.01)
(52) U.S. Cl. .......................... 375/341; 375/265
(58) Field of Classification Search .................. 375/261, 375/265, 322, 329, 340, 341
See application file for complete search history.

(56) References Cited

U.S. PATENT DOCUMENTS 7,680,214 B2 * 3/2010 Bui ................................ 375/316
2002/0131515 A1 * 9/2002 Rodriguez ..................... 375/262
2003/0053566 A1 3/2003 He et al.
2004/0096015 A1 5/2004 Ishii et al.
2005/0010855 A1 * 1/2005 Lusky ............................ 714/796
2005/0201484 A1 9/2005 Wilhelmsson et al.

FOREIGN PATENT DOCUMENTS

| JP | 2002-271211 | 9/2002 |
| JP | 2004-104188 | 4/2004 |
| JP | 2004-165937 | 6/2004 |
| JP | 2004-522375 | 7/2004 |
| WO | WO 03/007529 A1 | 1/2003 |

OTHER PUBLICATIONS

European Search Report dated Feb. 23, 2012.

* cited by examiner

*Primary Examiner* — David B. Lugo
(74) *Attorney, Agent, or Firm* — McGinn IP Law Group, PLLC

(57) ABSTRACT

A method of calculating at least one soft bit corresponding to a data symbol received by a radio receiver is described. In one form the method (300) includes, calculating an average amplitude at least one received data symbol. The method also includes calculating (304) at least one threshold amplitude in respect of the data symbol on the basis of the calculated average amplitude. Next a subset of constellation symbols is determined (310) at least partly on the basis of the at least one threshold, and for which a distance determination will be made. The distance between the position of the data symbol and each of the symbols in the subset of constellation symbols is determined (312) and then a soft bit corresponding to the received symbol is calculated (314) on the basis of said determined distances.

19 Claims, 5 Drawing Sheets

DEMODULATION METHOD

REFERENCE TO RELATED APPLICATION

This application is based upon and claims the benefit of the priorities of Australian provisional patent application No. 2006905197 filed on 20 Sep. 2006 and Australian standard patent application filed on 31 Aug. 2007, the disclosures of which are incorporated herein in their entirety by reference thereto.

FIELD OF THE INVENTION

The present invention relates to methods of demodulation used in a receiver in a wireless communications network, and a device and program therefor.

It is convenient to describe the preferred examples in connection with a system that uses turbo code and quadrature amplitude modulation (QAM). However the present invention should not be considered as being limited to the use of turbo code, but should be considered as being generally applicable to systems using any type of channel encoder such that the corresponding decoder uses soft inputs to recover the transmitted information bits.

BACKGROUND OF THE INVENTION

Communications systems often employ forward error correction in order to correct errors caused by noise generated in transport channels. For example, a communication system may use a "turbo code" for the forward error correction. At the transmitter side a turbo encoder introduces redundancy bits based on information bits. The encoded bits at the output of turbo encoder are then modulated and transmitted to the receiver. At the receiver end, the receiver demodulates the received signal and produce received encoded bits to the turbo decoder. A turbo decoder then decodes the received encoded bits to recover the information bits.

To maximize the advantage of the coding gain the receiver assigns each received encoded bit of value on a multi level scale that is representative of the probability that the bit is 1 (or 0).

One such scale is referred to as a Log-Likelihood Ratio (LLR) probability. Using LLR each bit is in general represented as a number between $-a$ to a ($a>0$). The value close to a signifies that the transmitted bit was 0 with a very high probability, and a value of $-a$ signifies that the transmitted bit was 1 with a very high probability. A value of 0 indicates that the logical bit value is indeterminate. The LLR value is then used as a soft bit.

The log likelihood $L(b_i)$ for i-th bit (i=0, 1, ..., N) can be calculated as:

$$L(b_i) = \ln \frac{P(b_i = 0 \mid y)}{P(b_i = 1 \mid y)} =$$

$$\ln \frac{\sum_{z\mid b_i=0} P(z \mid y)}{\sum_{z\mid b_i=1} P(z \mid y)} \approx \frac{1}{2\sigma^2} (\min_{z\mid b_i=1} |y-z|^2 - \min_{z\mid b_i=0} |y-z|^2)$$

where y is received QAM symbol, z is a QAM symbol in the reference QAM constellation, and $\sigma^2$ is noise variance.

From this formula, the computational complexity would involve
Step1/Estimation of $\sigma^2$
Step2/Estimation of reference QAM constellation (estimation of average amplitude of the desired signal)
Step3/Calculation of the distances and min searches
Step4/Division to get $L(b_i)$

SUMMARY OF THE DISCLOSURE

The above mentioned 'normal LLR' method is in general too computationally complex to implement as each bit requires a minimum distance search between the received QAM symbol and all reference constellation points.

Therefore, it is an object of the present invention to provide a novel method with less computational complexity and a device therefor.

Accordingly it is an object of the present invention to address the shortcomings of the prior art. In a preferred example it is an object of the invention to simplify the conventional LLR demodulation method by reducing the number of distance calculations needed to obtain soft bits.

In a first aspect, the present invention provides a method of calculating at least one soft bit corresponding to a data symbol received by a radio receiver, the method including: calculating an average amplitude for the at least one received data symbol; calculating at least one threshold amplitude in respect of the data symbol on the basis of the calculated average amplitude; determining a subset of constellation symbols at least partly on the basis of the at least one threshold, and for which a distance determination will be made; determining the distance between the position of the data symbol and each of the symbols in the subset of constellation symbols; and calculating a soft bit corresponding to the received symbol on the basis of said determined distances.

The step of, determining a subset of constellation symbols at least partly on the basis of the threshold, can include, determining a core constellation symbol associated with the received symbol at least partly on the basis of the threshold; and determining a plurality of additional constellation symbols associated with the core symbol.

Preferably the step of determining a plurality of additional constellation points associated with the core symbol is performed using a look up table.

Preferably when the received data symbol is modulated with 16 QAM, the subset of constellation symbols for which a distance determination is made includes 5 symbols.

Preferably, when the received data symbol is modulated with 64 QAM, the subset of constellation symbols for which a distance determination is made includes 7 symbols.

In a second aspect, the present invention provides a method of calculating at least one soft bit corresponding to a data symbol received by a radio receiver, the method including; determining a subset of constellation symbols at least partly on the basis of one or more threshold values calculated at least partly on the basis of the equalised received symbol, and for which a distance determination will be made; determining the distance between the position of the data symbol and each of the symbols in the subset of constellation symbols; calculating a soft bit corresponding to the equalised received symbol on the basis of said determined distances.

In a third aspect, the present invention provides a device for calculating at least one soft bit corresponding to a data symbol received by a radio receiver, including: means for calculating an average amplitude for the at least one equalised received data symbol; means for calculating at least one threshold amplitude in respect of the data symbol on the basis of the calculated average amplitude; means for determining a subset of constellation symbols at least partly on the basis of the at least one threshold, and for which a distance determination will be made; and means for determining the distance between the position of the data symbol and each of the subset of constellation symbols; means for calculating a soft bit corresponding to the equalised received symbol on the basis of said determined distances.

The device can further include a look up table for use in determining the subset of constellation symbols for which distance determinations will be made.

As a fourth aspect, the present invention provides a device for calculating at least one soft bit corresponding to a data symbol received by a radio receiver, including; an average amplitude calculating unit that calculates an average amplitude for the at least one received data symbol; a threshold amplitude calculating unit that calculates at least one threshold amplitude in respect of the data symbol on the basis of the calculated average amplitude; a subset determining unit that determines a subset of constellation symbols at least partly on the basis of the at least one threshold, and for which a distance determination will be made; a distance determining unit that determines the distance between the position of the data symbol and each of the symbols in the subset of constellation symbols; and a soft bit calculating unit that calculates a soft bit corresponding to the received symbol on the basis of said determined distances.

In a fifth aspect, the present invention provides a communication receiver including a device according to the third aspect of the present invention.

In a sixth aspect, the present invention provides computer readable programs which can process the method or operate the device of the present invention. Particularly, the program includes the processing steps as mentioned in the methods according to the first or second aspect.

The program may be stored on a recording medium or available through a communication network.

BRIEF DESCRIPTION OF THE DRAWINGS

Examples of the present invention will now be described by way of non-limiting example only, with reference to the accompanying drawings in which.

PREFERRED MODES

In broad concept modes for implementing a method according to the present invention simplify the conventional LLR demodulation method by reducing the number of distance calculations needed to obtain soft bits. In a preferred mode this is achieved by first determining the region, e.g. a square, on the I-Q grid in which the equalised received symbol should lie. The area is found from thresholds that are calculated from pilot symbols.

Once the region is determined, distances are calculated between the equalized received symbol and a fraction of the reference constellation points. The reference constellation points used are preferably pre-defined in a look up table and the distances calculated are directly used to calculate soft bits.

Figure 1:
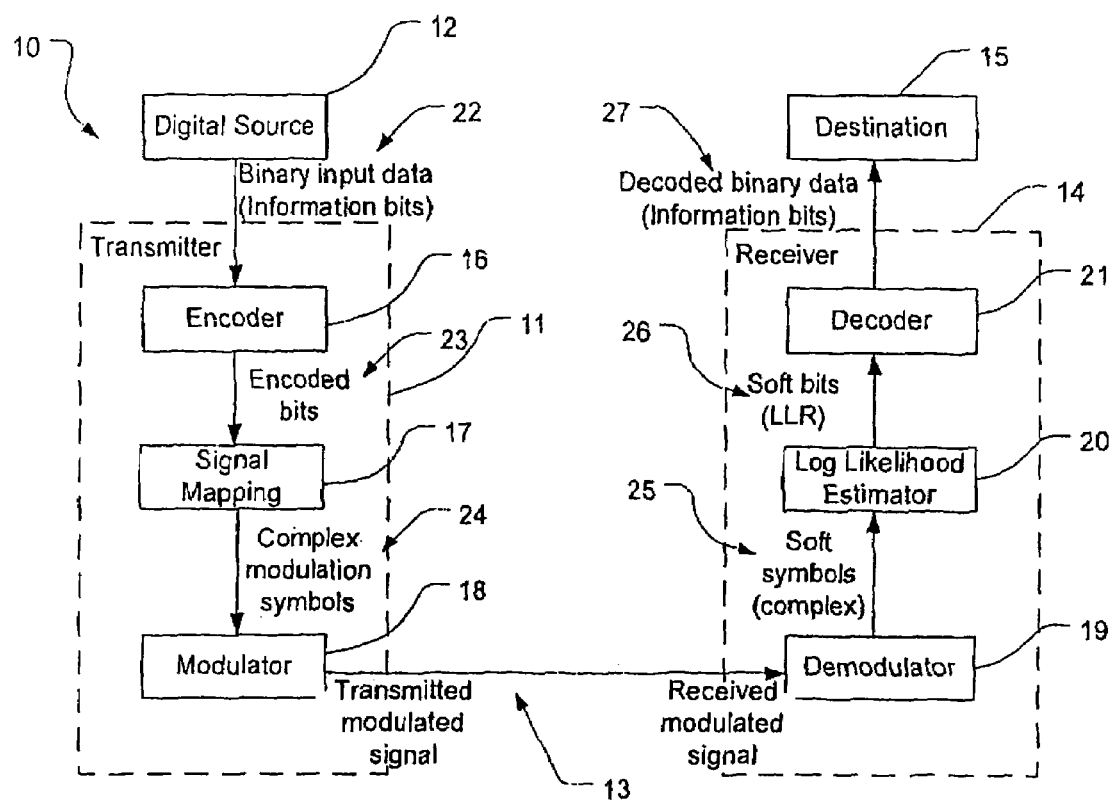
FIG. 1 is a schematic diagram of a communication system including a communication receiver in accordance with one example of the present invention.

FIG. 1 shows generally a communication system 10 including a transmitter 11, connected to a digital source 12. The transmitter 11 configured to receive binary input data from the digital source 12. The transmitter 11 generates and transmits a modulated signal 13 for reception by a receiver 14. The receiver 14 demodulates the received signal and attempts to recover decoded binary data which is then forwarded to a destination 15. The transmitter 11 includes an encoder 16, which may use turbo code or other Viterbi based encoding method such as convolutional codes to encode the binary input data 22. The transmitter also includes a signal mapping block 17 and modulator 18. The receiver includes a demodulator 19, log-likelihood estimator 20 and decoder 21. In a similar fashion to the encoder, the decoder 21 may use turbo code or other Viterbi based decoding scheme.

Binary input data 22 to be transmitted is encoded with a suitable code by the encoder 16, which generates a sequence of binary symbols 23 referred to as encoded bits. Several encoded bits are blocked together and mapped to a point on a signal constellation by the signal mapping block 17, thereby generating a sequence of complex-valued modulation symbols 24. This sequence is applied to the modulator 18, which generates a continuous time domain waveform for transmission to the receiver 14.

The demodulator 19 demodulates the received modulated signal and generates a sequence of complex-valued soft symbol 25. Each soft symbol represents an estimate of a modulation symbol that was transmitted by the transmitter 11. These estimates are used by the log-likelihood estimator 20 to extract log-likelihood metrics (soft bits) 26 associated with the given modulation symbol. The decoder 21 uses the sequence of log-likelihood metrics (soft bits) to decode the binary data that was originally transmitted and recover decoded binary data 27.

EXAMPLE 1

Figure 2:
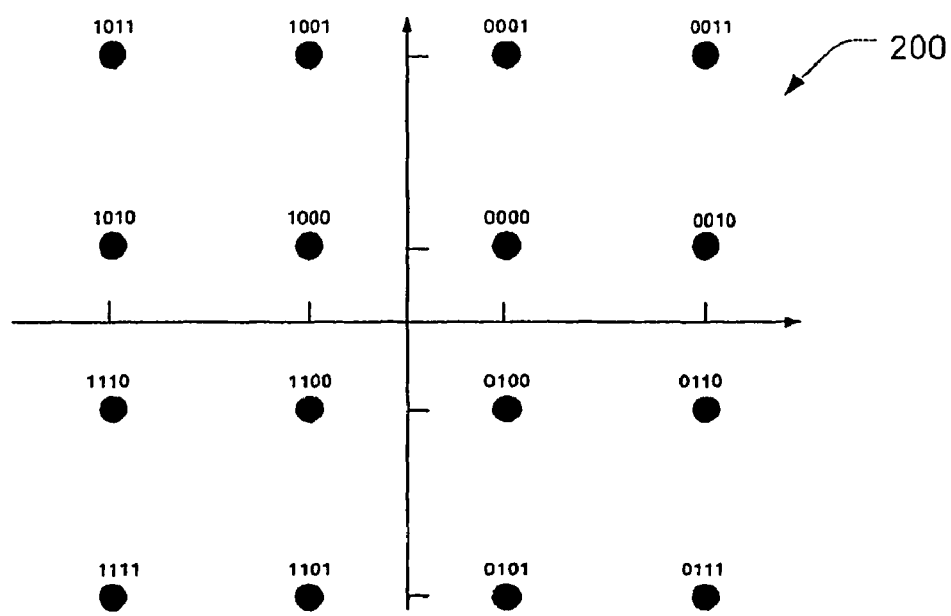
FIG. 2 is a diagram illustrating a 16-QAM signal constellation mapping.

A first example of the present invention will be described in the context of a signal modulated using 16-QAM. FIG. 2 depicts the square 16-QAM constellation. The constellation 200 has an index m=2 and is defined to be a signal constellation with $4^m$ points. The square 16-QAM constellation shown in FIG. 2 has an index m=2 and is defined to be a signal constellation with $4^m$ points. Each signal point is denoted by its index (i,j) where $0 \leq i,j < 2^m$. The position of each i,j point on the constellation is given by the following formula:

$$C_{i,j} = \{(2^m - 1 - 2i)\Delta, (2^m - 1 - 2j)\Delta\}$$

where $$\Delta = \sqrt{\frac{3}{4^m - 1}\left(\frac{1}{2}\right)}.$$

The above formula ensures that the average energy of the signal constellation is normalised to one, where $\Delta$ is a normalisation parameter for a square-QAM constellation. For a 16-QAM constellation, m=2 and $$\Delta = \frac{1}{\sqrt{10}}.$$

For other square-QAM constellations, the value of both m and $\Delta$ will change. Accordingly, for a 64-QAM constellation, m=3 and $$\Delta = \frac{1}{\sqrt{42}},$$

whilst for a 256-QAM constellation, m=4 and $$\Delta = \frac{1}{\sqrt{170}}.$$

Each signal point in the constellation is labelled with a binary string that denotes a block of encoded bits associated with the modulation symbol. A grey code mapping is used to associate the modulation symbols with blocks of encoded bits. In this case, each of the points in the constellation is identified by a 4 bit grey code having bits $b_0$, $b_1$, $b_2$ and $b_3$. In other square-QAM constellations, the number of bits in the grey code will vary. For example, in a 64-QAM constellation, each point is identified by a 6 bit grey code as will be seen in the second example described below.

Figure 3:
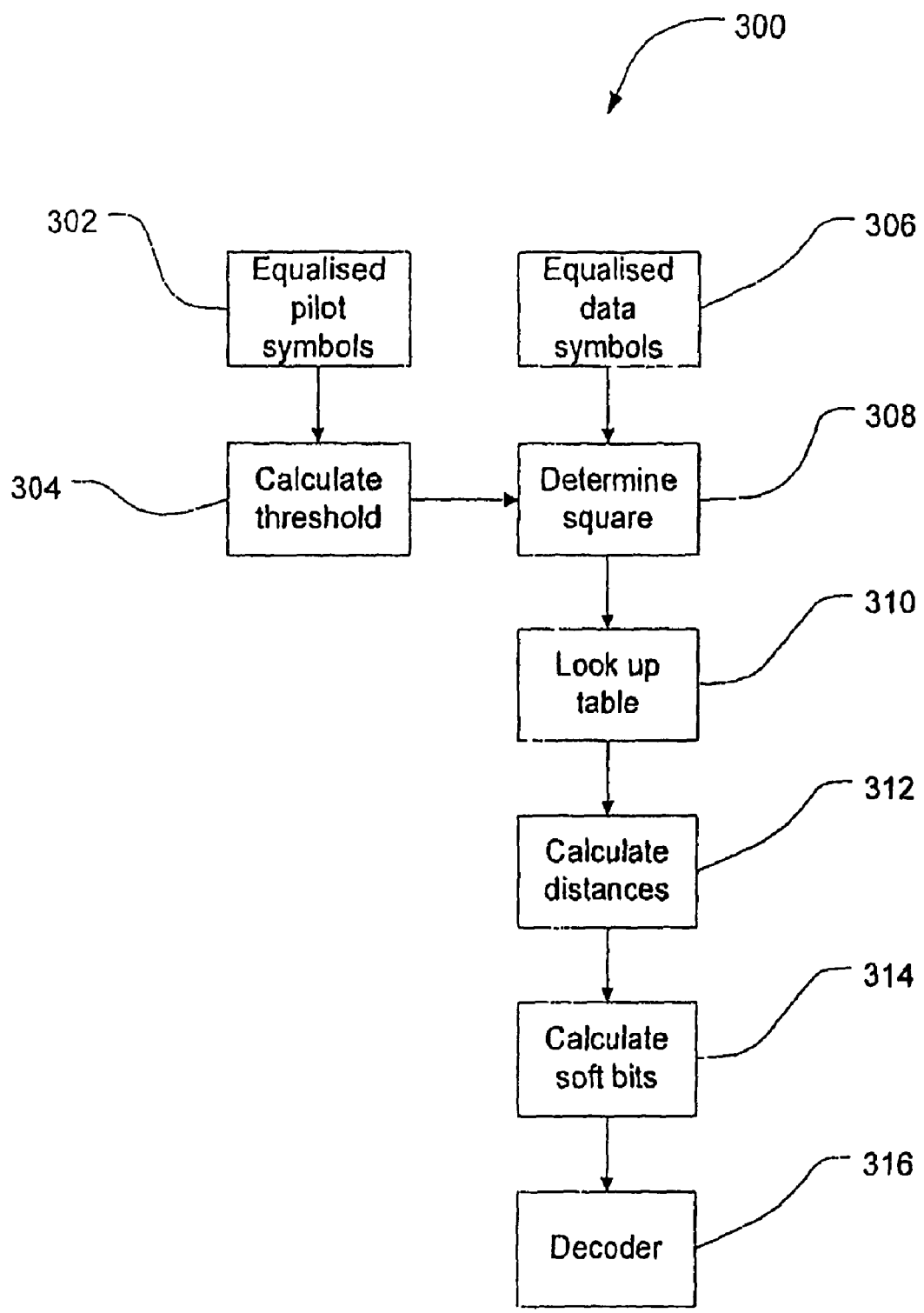
FIG. 3 is a flowchart depicting the main steps in a preferred example of the present invention.

FIG. 3 depicts a flowchart of the main steps in the preferred example of the present invention. As can be seen the method 300 begins with the reception and equalisation of one or more pilot symbols in step 302. The pilot symbols are used in step 304 to compute one or more threshold values to be applied to the received equalised data symbols in a manner to be described below.

In the preferred mode the threshold in step 304 is determined on the basis of the average data symbol amplitude, $A_{data}$. The average data symbol amplitude $A_{data}$ can be calculated in a known manner, e.g. calculated in the conventional LLR method above mentioned above. One preferred way of calculating $A_{data}$ is to use received pilot signals and a known ratio between power of pilot and data. For example following expression can be used to calculate $A_{data}$:

$$A_{data} = \sqrt{\frac{1}{P_{PD}} \left( \frac{1}{N} \sum_{k=1}^{N} \hat{y}_{k,p} \right)^2},$$

where $P_{PD}$ is the pilot to data power ratio, N is the number of pilots in the sample set and $\hat{y}_{k,p}$ are the equalised pilots assuming that all pilots are the same i.e.

$$y_{1,p} = y_{2,p} = \ldots = y_{N,p}.$$

Using the average data symbol amplitude $A_{data}$ the threshold $T_j$ can be calculated using the expression:

$$T_j = A_{data} \times C_j;$$

where $C_j$ is given by:

$$C_j = 2 \times j \times \Delta;$$

and where j is the number of thresholds needed (j=1 for 16-QAM and j={1,2,3} for 64-QAM). The scaling factor $\Delta$ is a normalisation parameter for a square-QAM constellation calculated as described above. For convenience, when using 16-QAM and 64-QAM, the values used for $\Delta$ are:

$$\Delta = \begin{cases} \frac{1}{\sqrt{10}} & \text{for } 16-QAM \\ \frac{1}{\sqrt{42}} & \text{for } 64-QAM \end{cases}$$

Next, in step 308 a core symbol which will be used as the basis for later distance calculations, is determined.

The 4 bits of the core symbol ($b_0 \ldots b_3$) are determined using the following criteria:

TABLE 1

Criteria for determining centre of region with 16-QAM

| $b_0$ | $b_1$ | $b_2$ | $b_3$ |
|---|---|---|---|
| If y_i ≥ 0 | If y_q ≥ 0 | If abs(y_i) ≤ T1 | If abs(y_q) ≤ T1 |
| $b_0 = 0$ | $b_1 = 0$ | $b_2 = 0$ | $b_3 = 0$ |
| Else | Else | Else | Else |
| $b_0 = 1$ | $b_1 = 1$ | $b_2 = 1$ | $b_3 = 1$ | where y_i and y_q are the I and Q components respectively of received symbol y, T1 is threshold determined as shown above.

Figure 4:
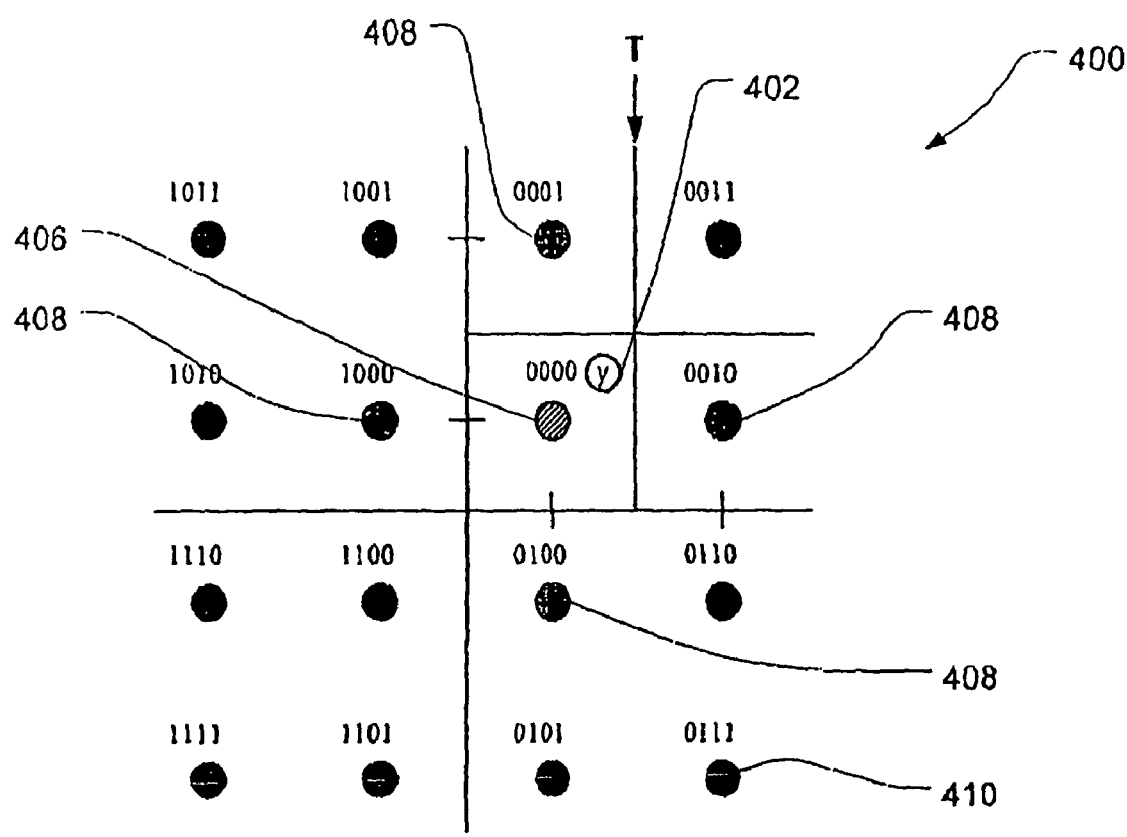
FIG. 4 depicts a diagram of a 16-QAM signal constellation mapping showing a received symbol and the constellation reference symbols over which distances will be calculated in an example of the present invention.

As an example, take the situation depicted in FIG. 4, which shows a 16QAM constellation diagram 400. The circle 402 represents the equalised received symbol, y. The circle 406 represents the reference constellation symbol that is closet to symbol y, and is referred to as the "core symbol". The circles 408 are a series of reference symbols associated with the core symbol 406.

In the example of FIG. 4, using the criteria in Table 1, the four bits $b_0$, $b_1$, $b_2$, $b_3$ of the core symbol, are determined to be 0000.

In step 310 of FIG. 3, a series of additional symbols surrounding the core symbol are determined using a look up table. The look up table is defined by finding the symbols nearest to the core symbol whose i-th bit is the opposite of the core symbol's i-th bit. This is illustrated in FIG. 4. In this example the core symbol (0000) is surrounded by reference symbols 408 (0001, 0010, 0100, 1000), which only differ from the core symbol (0000) by one bit. The following table sets out an exemplary look up table A for use with a 16-QAM example of the present invention.

| <Look up Table A> | |
|---|---|
| Core symbol | Surrounding reference symbols |
| 0000 | 0001 |
|  | 1000 |
|  | 0100 |
|  | 0010 |
| 0001 | 1001 |
|  | 0100 |
|  | 0011 |
|  | 0000 |
| 0010 | 1000 |
|  | 0110 |
|  | 0000 |
|  | 0011 |
| 0011 | 1001 |
|  | 0110 |
|  | 0001 |
|  | 0010 |
| 0100 | 1100 |
|  | 0000 |
|  | 0110 |
|  | 0101 |

-continued

<Look up Table A>

| Core symbol | Surrounding reference symbols |
|---|---|
| 0101 | 1101 |
|  | 0000 |
|  | 0111 |
|  | 0100 |
| 0110 | 1100 |
|  | 0010 |
|  | 0100 |
|  | 0111 |
| 0111 | 1101 |
|  | 0010 |
|  | 0101 |
|  | 0110 |
| 1000 | 0000 |
|  | 1100 |
|  | 1010 |
|  | 1001 |
| 1001 | 0001 |
|  | 1100 |
|  | 1011 |
|  | 1000 |
| 1010 | 0000 |
|  | 1110 |
|  | 1000 |
|  | 1011 |
| 1011 | 0001 |
|  | 1110 |
|  | 1001 |
|  | 1010 |
| 1100 | 0100 |
|  | 1000 |
|  | 1110 |
|  | 1101 |
| 1101 | 0101 |
|  | 1000 |
|  | 1111 |
|  | 1100 |
| 1110 | 0100 |
|  | 1010 |
|  | 1100 |
|  | 1111 |
| 1111 | 0101 |
|  | 1010 |
|  | 1101 |
|  | 1110 |

The look up table defines a group of reference symbols that are associated with the core symbol. Together with the core symbol they define a subset of reference symbols for which the distances from the received symbol y are calculated in step 312 of the method of FIG. 3. By limiting the distance calculations to this subset of the I-Q reference symbols instead of full set of 16 I-Q reference symbols, the total number of distance calculations performed is greatly reduced, thus reducing the overall complexity of the algorithm.

In a preferred form of the present invention the distance metric used for the distance calculation is the Euclidean distance, d, which is calculated as follows:

$$d=|\hat{y}-z|^2$$

where $\hat{y}$ and $z$ denote the received equalised and reference symbol respectively. However other distance metrics could potentially be used, such as, $$s=\hat{y}-z; q=\max(Re(s),Im(s))+0.5\min(Re(S),Im(s));$$
$$d=q^2.$$

Next in step 314, soft bits are calculated. The soft bits are calculated directly from the distances between the equalised received symbol and the set of reference constellation symbols defined in the look up table. The soft bits $\tilde{b}_i$ are determined by:

If $b_i$ of $z_c=0$, $$\tilde{b}_i = d_i - d_c$$

else $$\tilde{b}_i = d_c - d_i$$

where $\hat{y}$ is the received equalised symbol, $z_c$ is the core symbol, $z_i$ is the i-th surrounding reference symbol, $d_c$ is the distance between $\hat{y}$ and $z_c$, and $d_i$ is the distance between $\hat{y}$ and $z_i$.

The soft bits thus calculated are then passed to the decoder to decode the bits (in step 316 of FIG. 3) in a conventional manner.

EXAMPLE 2

The present Invention can be realized with higher order modulation schemes such as 64-QAM. Generally speaking the process followed in this case is the same as for 16-QAM, with the following changes:

As noted above, more thresholds are calculated.

Figure 5:
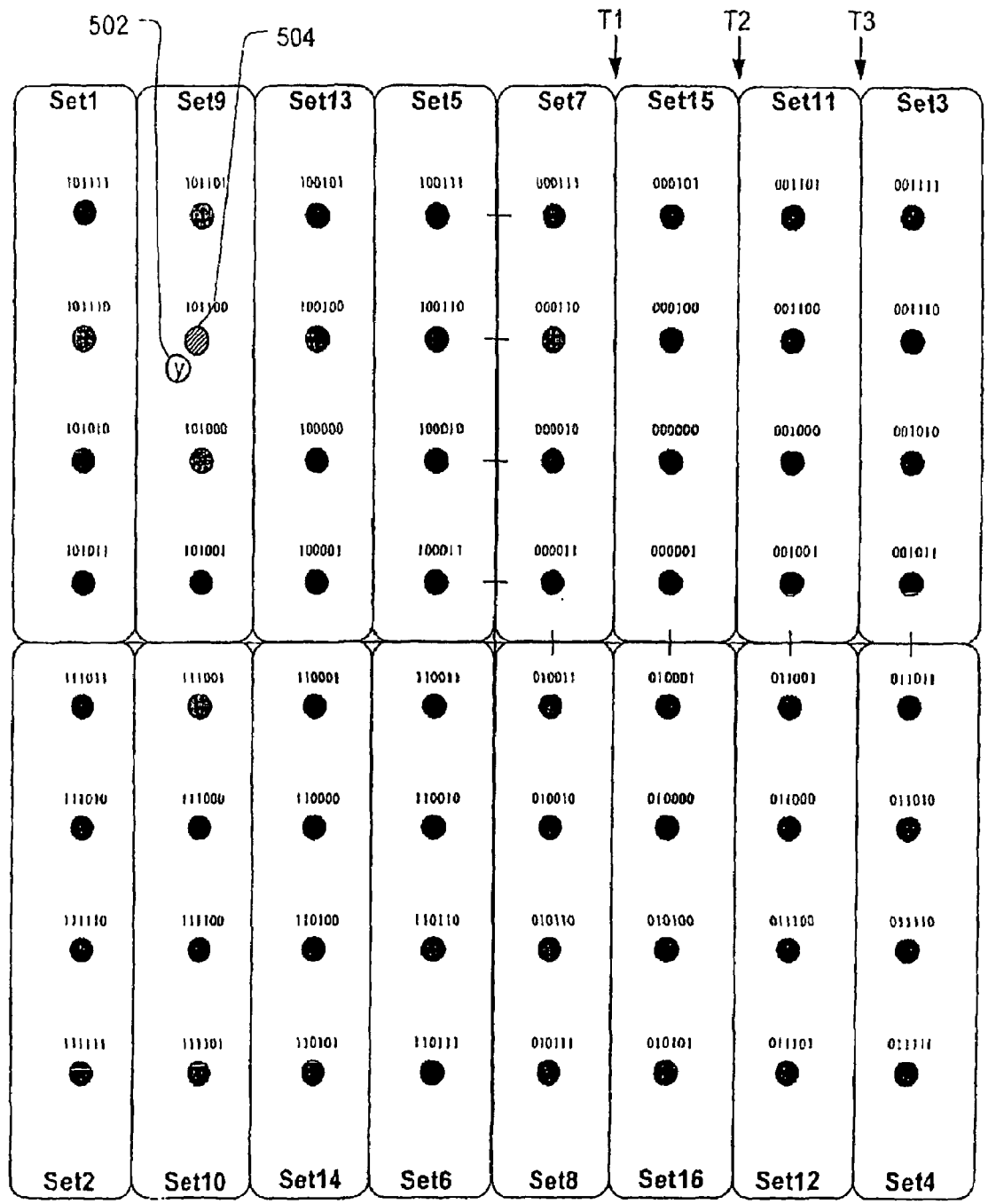
FIG. 5 depicts a diagram of a 64-QAM signal constellation mapping showing a received symbol and the constellation reference symbols over which distances will be calculated in another example of the present invention.

For 64-QAM a different set of constellation reference symbols is used, meaning that a different grey code is needed. This necessitates the use of a different set of criteria for determining the core symbol in step 308. For 64-QAM, given the constellation definition as shown in FIG. 5, the 6 bits for the core symbol ($b_0$-$b_5$) are determined using the following criteria:

TABLE 2

Criteria for determining core symbol with 64-QAM

| $b_0$ | $b_1$ | $b_2$ |
|---|---|---|
| If y_i ≧ 0 | If y_q ≧ 0 | If abs(z_i) ≦ T2 |
| b0 = 0 | b1 = 0 | b2 = 0 |
| Else | Else | Else |
| b0 = 1 | b1 = 1 | b2 = 1 |

| $b_3$ | $b_4$ | $b_5$ |
|---|---|---|
| If abs(z_q) ≦ T2 | If T1 ≦ abs(z_i) ≦ T3 | If T1 ≦ abs(z_q) ≦ T3 |
| b3 = 0 | b4 = 0 | b5 = 0 |
| Else | Else | Else |
| b3 = 1 | b4 = 1 | b5 = 1 |

A different look up table is needed for determining which surrounding reference symbols are to be used for distance calculations. In the example of FIG. 5 the following look up table B is used:

<Look up Table B>

| Square/core symbol | Surrounding reference symbols |
|---|---|
| 101111 | 000111 |
|  | 111011 |
|  | 100101 |
|  | 101010 |
|  | 101101 |
|  | 101110 |
| 101110 | 000110 |
|  | 111011 |
|  | 100100 |
|  | 101010 |
|  | 101100 |
|  | 101111 |

-continued

<Look up Table B>

| Square/core symbol | Surrounding reference symbols |
|---|---|
| 101010 | 000010 |
|  | 111011 |
|  | 100000 |
|  | 101110 |
|  | 101000 |
|  | 101011 |
| 101011 | 000011 |
|  | 111011 |
|  | 100001 |
|  | 101110 |
|  | 101001 |
|  | 101010 |
| 111111 | 010111 |
|  | 101011 |
|  | 110101 |
|  | 111010 |
|  | 111101 |
|  | 111110 |
| 111110 | 010110 |
|  | 101011 |
|  | 110100 |
|  | 111010 |
|  | 111100 |
|  | 111111 |
| 111010 | 010010 |
|  | 101011 |
|  | 110000 |
|  | 111110 |
|  | 111000 |
|  | 111011 |
| 111011 | 010011 |
|  | 101011 |
|  | 110001 |
|  | 111110 |
|  | 111001 |
|  | 111010 |
| 001111 | 100111 |
|  | 011011 |
|  | 000101 |
|  | 001010 |
|  | 001101 |
|  | 001110 |
| 001110 | 100110 |
|  | 011011 |
|  | 000100 |
|  | 001010 |
|  | 001100 |
|  | 001111 |
| 001010 | 100010 |
|  | 011011 |
|  | 000000 |
|  | 001110 |
|  | 001000 |
|  | 001011 |
| 001011 | 100011 |
|  | 011011 |
|  | 000001 |
|  | 001110 |
|  | 001001 |
|  | 001010 |
| 011111 | 110111 |
|  | 001011 |
|  | 010101 |
|  | 011010 |
|  | 011101 |
|  | 011110 |
| 011110 | 110110 |
|  | 001011 |
|  | 010100 |
|  | 011010 |
|  | 011100 |
|  | 011111 |

-continued

<Look up Table B>

| Square/core symbol | Surrounding reference symbols |
|---|---|
| 011010 | 110010 |
|  | 001011 |
|  | 010000 |
|  | 011110 |
|  | 011000 |
|  | 011011 |
| 011011 | 110011 |
|  | 001011 |
|  | 010001 |
|  | 011110 |
|  | 011001 |
|  | 011010 |
| 100111 | 000111 |
|  | 110011 |
|  | 101101 |
|  | 100010 |
|  | 100101 |
|  | 100110 |
| 100110 | 000110 |
|  | 110011 |
|  | 101100 |
|  | 100010 |
|  | 100100 |
|  | 100111 |
| 100010 | 000010 |
|  | 110011 |
|  | 101000 |
|  | 100110 |
|  | 100000 |
|  | 100011 |
| 100011 | 000011 |
|  | 110011 |
|  | 101001 |
|  | 100110 |
|  | 100001 |
|  | 100010 |
| 110111 | 010111 |
|  | 100011 |
|  | 111101 |
|  | 110010 |
|  | 110101 |
|  | 110110 |
| 110110 | 010110 |
|  | 100011 |
|  | 111100 |
|  | 110010 |
|  | 110100 |
|  | 110111 |
| 110010 | 010010 |
|  | 100011 |
|  | 111000 |
|  | 110110 |
|  | 110000 |
|  | 110011 |
| 110011 | 010011 |
|  | 100011 |
|  | 111001 |
|  | 110110 |
|  | 110001 |
|  | 110010 |
| 000111 | 100111 |
|  | 010011 |
|  | 001101 |
|  | 000010 |
|  | 000101 |
|  | 000110 |
| 000110 | 100110 |
|  | 010011 |
|  | 001100 |
|  | 000010 |
|  | 000100 |
|  | 000111 |

<Look up Table B>

| Square/core symbol | Surrounding reference symbols |
|---|---|
| 000010 | 100010 |
| | 010011 |
| | 001000 |
| | 000110 |
| | 000000 |
| | 000011 |
| 000011 | 100011 |
| | 010011 |
| | 001001 |
| | 000110 |
| | 000001 |
| | 000010 |
| 010111 | 110111 |
| | 000011 |
| | 011101 |
| | 010010 |
| | 010101 |
| | 010110 |
| 010110 | 110110 |
| | 000011 |
| | 011100 |
| | 010010 |
| | 010100 |
| | 010111 |
| 010010 | 110010 |
| | 000011 |
| | 011000 |
| | 010110 |
| | 010000 |
| | 010011 |
| 010011 | 110011 |
| | 000011 |
| | 011001 |
| | 010110 |
| | 010001 |
| | 010010 |
| 101101 | 000111 |
| | 111001 |
| | 100101 |
| | 101000 |
| | 101111 |
| | 101100 |
| 101100 | 000110 |
| | 111001 |
| | 100100 |
| | 101000 |
| | 101110 |
| | 101101 |
| 101000 | 000010 |
| | 111001 |
| | 100000 |
| | 101100 |
| | 101010 |
| | 101001 |
| 101001 | 000011 |
| | 111001 |
| | 100001 |
| | 101100 |
| | 101011 |
| | 101000 |
| 111101 | 010111 |
| | 101001 |
| | 110101 |
| | 111000 |
| | 111111 |
| | 111100 |
| 111100 | 010110 |
| | 101001 |
| | 110100 |
| | 111000 |
| | 111110 |
| | 111101 |
| 111000 | 010010 |
| | 101001 |
| | 110000 |
| | 111100 |
| | 111010 |
| | 111001 |
| 111001 | 010011 |
| | 101001 |
| | 110001 |
| | 111100 |
| | 111011 |
| | 111000 |
| 001101 | 100111 |
| | 011001 |
| | 000101 |
| | 001000 |
| | 001111 |
| | 001100 |
| 001100 | 100110 |
| | 011001 |
| | 000100 |
| | 001000 |
| | 001110 |
| | 001101 |
| 001000 | 100010 |
| | 011001 |
| | 000000 |
| | 001100 |
| | 001010 |
| | 001001 |
| 001001 | 100011 |
| | 011001 |
| | 000001 |
| | 001100 |
| | 001011 |
| | 001000 |
| 011101 | 110111 |
| | 001001 |
| | 010101 |
| | 011000 |
| | 011111 |
| | 011100 |
| 011100 | 110110 |
| | 001001 |
| | 010100 |
| | 011000 |
| | 011110 |
| | 011101 |
| 011000 | 110010 |
| | 001001 |
| | 010000 |
| | 011100 |
| | 011010 |
| | 011001 |
| 011001 | 110011 |
| | 001001 |
| | 010001 |
| | 011100 |
| | 011011 |
| | 011000 |
| 100101 | 000111 |
| | 110001 |
| | 101101 |
| | 100000 |
| | 100111 |
| | 100100 |
| 100100 | 000110 |
| | 110001 |
| | 101100 |
| | 100000 |
| | 100110 |
| | 100101 |

<Look up Table B>

| Square/core symbol | Surrounding reference symbols |
|---|---|
| 100000 | 000010 |
|  | 110001 |
|  | 101000 |
|  | 100100 |
|  | 100010 |
|  | 100001 |
| 100001 | 000011 |
|  | 110001 |
|  | 101001 |
|  | 100100 |
|  | 100011 |
|  | 100000 |
| 110101 | 010111 |
|  | 100001 |
|  | 111101 |
|  | 110000 |
|  | 110111 |
|  | 110100 |
| 110100 | 010110 |
|  | 100001 |
|  | 111100 |
|  | 110000 |
|  | 110110 |
|  | 110101 |
| 110000 | 010010 |
|  | 100001 |
|  | 111000 |
|  | 110100 |
|  | 110010 |
|  | 110001 |
| 110001 | 010011 |
|  | 100001 |
|  | 111001 |
|  | 110100 |
|  | 110011 |
|  | 110000 |
| 000101 | 100111 |
|  | 010001 |
|  | 001101 |
|  | 000000 |
|  | 000111 |
|  | 000100 |
| 000100 | 100110 |
|  | 010001 |
|  | 001100 |
|  | 000000 |
|  | 000110 |
|  | 000101 |
| 000000 | 100010 |
|  | 010001 |
|  | 001000 |
|  | 000100 |
|  | 000010 |
|  | 000001 |
| 000001 | 100011 |
|  | 010001 |
|  | 001001 |
|  | 000100 |
|  | 000011 |
|  | 000000 |
| 010101 | 110111 |
|  | 000001 |
|  | 011101 |
|  | 010000 |
|  | 010111 |
|  | 010100 |
| 010100 | 110110 |
|  | 000001 |
|  | 011100 |
|  | 010000 |
|  | 010110 |
|  | 010101 |
| 010000 | 110010 |
|  | 000001 |
|  | 011000 |
|  | 010100 |
|  | 010010 |
|  | 010001 |
| 010001 | 110011 |
|  | 000001 |
|  | 011001 |
|  | 010100 |
|  | 010011 |
|  | 010000 |

As can be seen in FIG. 5 the equalised symbol 502 is found to be closest to the core symbol 101100. Using the look up table it can be seen that the reference symbols associated with this core symbol, illustrated in grey on FIG. 5, are: 000110, 111001, 100100, 101000, 101110 and 101101. Thus a subset of the total I-Q constellation containing the core symbol and corresponding associated symbols is defined and the distance between the received symbol y and each symbol in the subset can then be calculated.

[Extended Applicabilities]

It should be noted that, whist the illustrative examples have been described in the context of square 16-QAM and 64-QAM modulation schemes the method can be applied to higher order-QAM constellations (e.g. 256-QAM) or to constellations with different definitions.

[Meritorious Effects]

As can be seen from the foregoing, in the preferred examples the computational reduction offered by the invention, may be significant, for example, with 16-QAM, the number of distance calculations for each received symbol can be reduced from 16 to 5 and for 64-QAM, the number of distance calculations can be reduced from 64 to 7.

[Programs]

According to seventh aspect, the methods of the present invention can be implemented by way of a computer which is operated by a corresponding program or programs including specific processing steps corresponding to the steps of the method. The processing unit (or units) may be implemented in a device of transmitter or receiver, respectively.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

In the present invention, a variety of modes are possible as follows:

(Mode 1)

A device for calculating at least one soft bit corresponding to a data symbol received by a radio receiver, including:

means for calculating an average amplitude for the at least one received data symbol;

means for calculating at least one threshold amplitude in respect of the data symbol on the basis of the calculated average amplitude;

means for determining a subset of constellation symbols at least partly on the basis of the at least one threshold, and for which a distance determination will be made;

means for determining the distance between the position of the data symbol and each symbol of the subset of constellation symbols;

means for calculating a soft bit corresponding to the received symbol on the basis of said determined distances.

(Mode 2)

A method of calculating at least one soft bit corresponding to a data symbol received by a radio receiver, the method including:

calculating at least one threshold amplitude in respect of the data symbol on the basis of an average amplitude;

determining a subset of constellation symbols at least partly on the basis of the at least one threshold, and for which a distance determination will be made; and determining the distance between the position of the data symbol and each of the symbols in the subset of constellation symbols.

(Mode 3)

A device for calculating at least one soft bit corresponding to a data symbol received by a radio receiver, including:

means for calculating at least one threshold amplitude in respect of the data symbol on the basis of an average amplitude;

means for determining a subset of constellation symbols at least partly on the basis of the at least one threshold, and for which a distance determination will be made; and means for determining the distance between the position of the data symbol and each symbol of the subset of constellation symbols.

(Mode 4)

A program of calculating at least one soft bit corresponding to a data symbol received by a radio receiver, the program comprising processing steps of:

calculating at least one threshold amplitude in respect of the data symbol on the basis of an average amplitude;

determining a subset of constellation symbols at least partly on the basis of the at least one threshold, and for which a distance determination will be made; and determining the distance between the position of the data symbol and each of the symbols in the subset of constellation symbols.

The invention claimed is:

1. A method of calculating at least one soft bit corresponding to a data symbol received by a radio receiver, the method including:

determining a subset of constellation symbols at least partly on the basis of one or more threshold values calculated at least partly on the basis of the received symbol, and for which a distance determination will be made;

determining the distance between the position of the data symbol and each of the symbols in the subset of constellation symbols; and calculating, by a processor, a soft bit corresponding to the received symbol on the basis of said determined distances.

2. A method of calculating at least one soft bit corresponding to a data symbol received by a radio receiver as claimed in claim 1, the method including:

calculating an average amplitude for the at least one received data symbol; and calculating at least one threshold amplitude in respect of the data symbol on the basis of the calculated average amplitude.

3. A method of calculating a soft bit corresponding to a data symbol as claimed in claim 2, wherein the determining a subset of constellation symbols at least partly on the basis of the threshold, includes:

determining a core constellation symbol associated with the received symbol at least partly on the basis of the threshold; and determining a plurality of additional constellation symbols associated with the core symbol.

4. A method of calculating a soft bit corresponding to a data symbol as claimed in claim 3, wherein the determining a plurality of additional constellation points associated with the core symbol is performed using a look up table.

5. A method of calculating a soft bit corresponding to a data symbol as claimed in claim 2, wherein the received data symbol is modulated with 16 QAM and the subset of constellation symbols for which a distance determination is made includes 5 symbols.

6. A method of calculating a soft bit corresponding to a data symbol as claimed in claim 2, wherein the received data symbol is modulated with 64 QAM and the subset of constellation symbols for which a distance determination is made includes 7 symbols.

7. A device for calculating at least one soft bit corresponding to a data symbol received by a radio receiver, including:

an average amplitude calculating unit that calculates an average amplitude for the at least one received data symbol;

a threshold amplitude calculating unit that calculates at least one threshold amplitude in respect of the data symbol on the basis of the calculated average amplitude;

a subset determining unit that determines a subset of constellation symbols at least partly on the basis of the at least one threshold, and for which a distance determination will be made;

a distance determining unit that determines the distance between the position of the data symbol and each of the symbols in the subset of constellation symbols; and a soft bit calculating unit that calculates a soft bit corresponding to the received symbol on the basis of said determined distances.

8. A device for calculating at least one soft bit corresponding to a data symbol received by a radio receiver as claimed in claim 7, wherein the device further includes a look up table for use in determining the subset of constellation symbols for which distance determinations will be made.

9. A device for calculating at least one soft bit corresponding to a data symbol received by a radio receiver as claimed in claim 7, wherein the means for determining a subset of constellation symbols is configured to determine a core constellation symbol associated with the received symbol at least partly on the basis of the threshold; and determine a plurality of additional constellation symbols associated with the core symbol.

10. A device for calculating at least one soft bit corresponding to a data symbol received by a radio receiver as claimed in claim 7, wherein the received data symbol is modulated with 16 QAM and the subset of constellation symbols for which a distance determination is made includes 5 symbols.

11. A device for calculating at least one soft bit corresponding to a data symbol received by a radio receiver as claimed in claim 7, wherein the received data symbol is modulated with 64 QAM and the subset of constellation symbols for which a distance determination is made includes 7 symbols.

12. A communication receiver including the device according to claim 7.

13. A non-transitory computer-readable medium containing a program of calculating at least one soft bit corresponding to a data symbol received by a radio receiver, the program comprising processing:
- determining a subset of constellation symbols at least partly on the basis of one or more threshold values calculated at least partly on the basis of the received symbol, and for which a distance determination will be made;
- determining the distance between the position of the data symbol and each of the symbols in the subset of constellation symbols; and
- calculating a soft bit corresponding to the received symbol on the basis of said determined distances.

14. A non-transitory computer-readable medium containing a program of calculating at least one soft bit corresponding to a data symbol received by a radio receiver as claimed in claim 13, the program further comprising processing:
- calculating an average amplitude for the at least one received data symbol; and
- calculating at least one threshold amplitude in respect of the data symbol on the basis of the calculated average amplitude.

15. The non-transitory computer-readable medium containing a program as claimed in claim 14, wherein said processing of determining a subset of constellation symbols at least partly on the basis of the threshold, includes further processing of:
- determining a core constellation symbol associated with the received symbol at least partly on the basis of the threshold; and
- determining a plurality of additional constellation symbols associated with the core symbol.

16. The non-transitory computer-readable medium containing a program as claimed in claim 15, wherein the processing of determining a plurality of additional constellation points associated with the core symbol is performed using a look up table.

17. The non-transitory computer-readable medium containing a program as claimed in claim 14, wherein the received data symbol is modulated with 16 QAM and the subset of constellation symbols for which a distance determination is made includes 5 symbols.

18. The non-transitory computer-readable medium containing a program as claimed in claim 14, wherein the received data symbol is modulated with 64QAM and the subset of constellation symbols for which a distance determination is made includes 7 symbols.

19. A device for calculating at least one soft bit corresponding to a data symbol received by a radio receiver, including:
- a threshold amplitude calculating unit that calculates at least one threshold amplitude in respect of the data symbol on the basis of an average amplitude;
- a subset determining unit that determines a subset of constellation symbols at least partly on the basis of the at least one threshold, and for which a distance determination will be made; and
- a distance determining unit that determines the distance between the position of the data symbol and each of the symbols in the subset of constellation symbols.

* * * * *